United States Patent
Kao

(10) Patent No.: US 9,954,432 B2
(45) Date of Patent: Apr. 24, 2018

(54) POWER SUPPLY APPARATUS WITH SOFT-START AND PROTECTION

(71) Applicants: HAN-WIN TECHNOLOGY CO. LTD., New Taipei (TW); Han-Jung Kao, New Taipei (TW)

(72) Inventor: Han-Jung Kao, New Taipei (TW)

(73) Assignees: HAN-WIN TECHNOLOGY CO. LTD., New Taipei (TW); Han-Jung Kao, New Taipei (TW)

( * ) Notice: Subject to any disclaimer, the term of this patent is extended or adjusted under 35 U.S.C. 154(b) by 0 days.

(21) Appl. No.: 15/640,560

(22) Filed: Jul. 2, 2017

(65) Prior Publication Data

US 2018/0006550 A1    Jan. 4, 2018

(30) Foreign Application Priority Data

Jul. 4, 2016    (TW) .............................. 105210035 U
Mar. 29, 2017    (TW) .............................. 106204431 U
May 15, 2017    (TW) .............................. 106206915 U

(51) Int. Cl.
*H02M 1/36*    (2007.01)
*H02H 7/12*    (2006.01)
*H02M 1/00*    (2006.01)

(52) U.S. Cl.
CPC ............... *H02M 1/36* (2013.01); *H02H 7/12* (2013.01); *H02M 2001/0009* (2013.01)

(58) Field of Classification Search
CPC . G05F 3/30; G05F 3/247; G05F 3/262; G05F 3/265; G05F 3/901; H02H 7/12; H02M 1/36

USPC .................. 323/222, 288, 315, 901
See application file for complete search history.

(56) References Cited

U.S. PATENT DOCUMENTS

| | | | | |
|---|---|---|---|---|
| 4,461,990 A * | 7/1984 | Bloomer | ................... | G05F 1/44 323/235 |
| 5,451,750 A * | 9/1995 | An | ..................... | H02M 7/53846 219/716 |
| 6,037,754 A * | 3/2000 | Harper | .................. | H02M 3/156 323/222 |
| 6,624,619 B2 * | 9/2003 | Fujita | ...................... | H02M 3/07 323/288 |
| 7,129,679 B2 * | 10/2006 | Inaba | .................... | H02M 3/156 323/222 |
| 7,262,582 B2 * | 8/2007 | Warita | .................... | H02M 1/36 323/222 |

* cited by examiner

*Primary Examiner* — Yemane Mehari
(74) *Attorney, Agent, or Firm* — Maschoff Brennan

(57) ABSTRACT

A power supply apparatus with soft-start function is suitable to a load including a voltage stabilizing unit and a load unit coupled in parallel. The power supply apparatus includes a power unit, a soft-start adjusting unit, a current detecting unit and a controlling unit. The power unit generates a power voltage. The soft-start adjusting unit receives the power voltage, a first controlling signal and a second controlling signal, and transforms the power voltage to a soft-start current accordingly to output the soft-start current to the voltage stabilizing unit or output the power voltage to the voltage stabilizing unit. The current detecting unit measures a current of a loop formed between the power unit and the voltage stabilizing unit to generate a current detecting signal. The controlling unit receives the current detecting signal to generate the first controlling signal and second controlling signal.

22 Claims, 6 Drawing Sheets

POWER SUPPLY APPARATUS WITH SOFT-START AND PROTECTION

CROSS REFERENCE TO RELATED APPLICATION

This application claims the priority benefit of Taiwan Patent Application Serial Number 105210035, filed on Jul. 4, 2016, 106204431, filed on Mar. 29, 2017 and 106206915, filed on May 15, 2017, the full disclosure of which is incorporated herein by reference.

BACKGROUND

Technical Field

This disclosure generally relates to a power supplying apparatus and, more particularly, to power supply apparatus with soft-start and protection.

Related Art

In general, an apparatus (including controlling and driving circuits thereof), such as a motor or a server, needs to connect to a power supply apparatus with high power, so as to obtain the power provided by the power supply apparatus for normal operation. However, an input terminal of the apparatus, such as the motor or the server, is often equipped with a voltage stabilizing circuit (usually composed of one or more large capacitors). The voltage stabilizing circuit is used to provide a stabilized voltage stabilizing when a load is changed. When a main power switch of the power supply apparatus with high power suddenly starts to work, the large capacitors of the voltage stabilizing circuit may suddenly generate a huge current, i.e. an inrush current. Since the excessive inrush current is generated, the protection circuit may erroneously determine that a short circuit occurs and start a short circuit protection function. Thus such that the motor or the server would not normally work.

Even, the power supplying apparatus may support soft-start. However, the user sometimes starts the power supplying apparatus before the power supplying apparatus is connected to the load. Then the soft-start function is finished without a load. This results in a power voltage generated at the output end of the power supplying apparatus. Under such circumstance, when the user connects the power supplying apparatus to the load, a huge inrush current may suddenly occurs, such that the protection circuit may erroneously determine that the circuit is short-circuited and starts the short circuit protection function, thereby resulting in malfunction on the motor or the sever.

Besides, in order to ensure that the power supply apparatus may still supply the power to the load (motor or server) for operating, some manufactory may remove the protection mechanism or raise the protection point. However, long term existence of the inrush current may damage the power supply apparatus and the internal components thereof. Thus the power supply apparatus would not work stably or the lifespan of the power supply apparatus may be shortened. Therefore, the power supply apparatus needs improvement and needs a new structure to maintain the normal operation and reliability of the product.

Besides, a load apparatus may have been damaged or failed with internal short-circuit issue, when the damaged or failed load apparatus is connected to the power supply apparatus, generally a true short circuit condition happens with big short circuit current to result short circuit protection. User may release short circuit protection without fixing the damaged or failed load apparatus, and then re-try and re-connect it to the power supply apparatus, such that the true short circuit condition will happen again and again to cause safety issue. There should be room to improve and to avoid this kind of big short circuit current happening again and again for safety concern.

SUMMARY

The disclosure provides a power supply apparatus with a soft-start and protection, thereby avoiding generating an inrush current that damages a circuit and avoiding that the power supplying apparatus is locked in a protection state since the just instantaneous inrush current resulted in mistakenly determining the circuit as the short circuit. At the same time, the current value and energy of the inrush current may be depressed and divided, thereby improving the safety, convenience and reliability of circuit.

The disclosure provides a power supply apparatus with a soft-start function, which is suitable to supply power to a load. The load includes a voltage stabilizing unit and a load unit coupled in parallel. The power supply apparatus with the soft-start function includes a power unit, a soft-start adjusting unit, a current detecting unit and a controlling unit. The power unit generates a power voltage which could be under monitoring and known voltage. The soft-start adjusting unit is coupled to the power unit and suitable to couple to the voltage stabilizing unit, receives the power voltage, a first controlling signal, a second controlling signal (and a plurality of fourth controlling signals), and transforms the power voltage to a soft-start current according to the first controlling signal, a second controlling signal (and the fourth controlling signals), so as to adjust and output the soft-start current to the voltage stabilizing unit or output the power voltage to the voltage stabilizing unit (or stop outputting the power voltage to the voltage stabilizing unit). The current detecting unit is coupled to the power unit and suitable to couple to the voltage stabilizing unit, measures a current of a loop formed between the power unit and the voltage stabilizing unit, so as to generate a current detecting signal. The controlling unit is coupled to the current detecting unit, receives the current detecting signal, so as to generate the first controlling signal, the second controlling signal (and the fourth controlling signals).

The disclosure provides a power supply apparatus with a protection mechanism, which includes a power unit, a soft-start adjusting unit, an output end, a detecting unit and a controlling unit. The power unit generates a power voltage. The soft-start adjusting unit is coupled to the power unit, receives the power voltage and a plurality of controlling signals, and transforms the power voltage to a soft-start current according to the controlling signals, so as to adjust and output the soft-start current or output or stop outputting the power voltage. The output end is coupled to the soft-start adjusting unit and suitable to output the soft-start current or the power voltage. The detecting unit is coupled to output end and detects a current state and/or a voltage state, so as to generate a detecting signal. The controlling unit is coupled to the detecting unit and the soft-start adjusting unit, receives the detecting signal, so as to generate the controlling signals.

The disclosure provides a power supply apparatus with protection mechanism, which includes a power unit, a main power switch, an output end, a detecting unit and a controlling unit. The power unit generates a power voltage. The main power switch is coupled to the power unit, receives the power voltage and a (or more) controlling signal(s), and output or stop outputting the power voltage according to the controlling signal. The output end is coupled to the main power switch and suitable to output the power voltage. The detecting unit is coupled to output end and detects a current state and/or a voltage state, so as to generate a detecting signal. The controlling unit is coupled to the detecting unit and the main power switch, receives the detecting signal, so as to generate the controlling signal.

According to the power supply apparatus with the soft-start function and the protection mechanism of the embodiments of the disclosure, the controlling unit generates the first controlling signal, the second controlling signal (and the fourth controlling signals) according to the current detecting signal generated by the current detecting unit, so as to control the soft-start adjusting unit to adjust a magnitude of the current value of the soft-start current, such that the working voltage accumulated by the voltage stabilizing unit suitably is increased to equal to or similar to the voltage value of the power voltage according to the soft-start adjusting unit, thereby finishing the soft-start process and then directly outputting the power voltage to the voltage stabilizing unit. Therefore an inrush current generated to damage a circuit function may be effectively avoided. If the soft-start process fails due to an outer short circuit, the controlling unit can detect the failure and perform some protection actions, stop outputting the power, generating an alarm, and even turn off the whole power system. Additionally, the displaying unit may further shows whether the circuit is a short circuit or in other conditions, so as to increase the circuit security. Furthermore, the controlling unit may generates the corresponding first controlling signal, the corresponding second controlling signal (and the corresponding fourth controlling signals) according to the current detecting signal and/or the voltage detecting signal generated by the voltage detecting unit at the same time.

Additionally, the detecting unit detects the current state and/or the voltage state of the output end to generate the detecting signal, and the controlling unit determines the operation state of the power supplying apparatus with the protection mechanism according to the detecting signal and generates the corresponding controlling signal to control the soft-start adjusting unit or the main power switch to perform the corresponding operation, so as to determines whether the output voltage is provided continuously or the protection state is entered. Therefore it can effectively and accurately determine the occurrence of the circuit current to avoid the mistake operation, i.e. avoid the erroneous determination of the short circuit due to the merely instantaneous inrush current. At the same time, through the soft-start process introduced by the soft-start adjusting unit, or by forcing the main power switch to turn on according to a predetermined time and a predetermined counter and a (programmable) short circuit protection mechanism, the current and energy of the huge inrush current is divided, so as to avoid that the power supplying apparatus with the protection mechanism is locked in the protection state.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
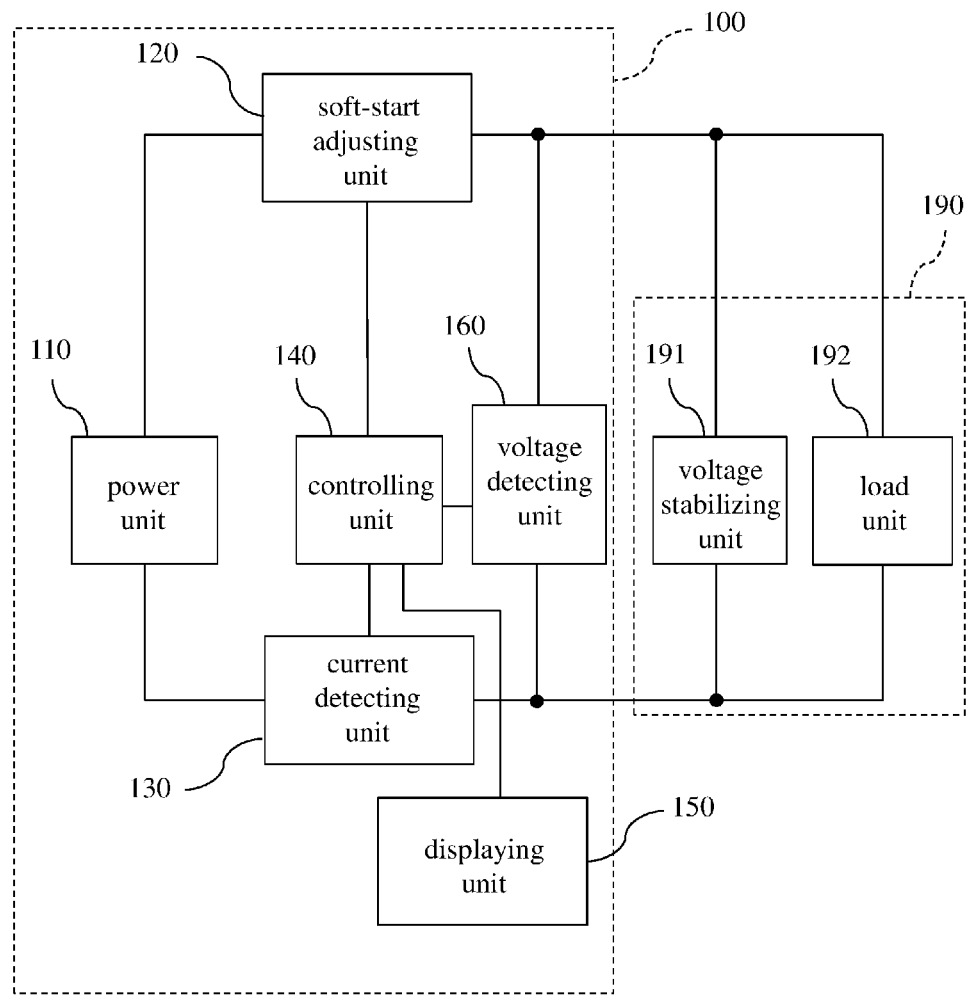
FIG. 1 shows a schematic diagram of a power supply apparatus with a soft-start function according to a first embodiment of the disclosure.

The disclosure will now be described more fully hereinafter with reference to the accompanying drawings, in which exemplary embodiments of the invention are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect. Additionally the term "couple" or "connect" covers any direct or indirect electrically coupling means. Therefore when one device is electrically connected to another device in the context, that connection may be through a direct electrical connection, or through an indirect electrical connection via other devices and connections. The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals is used to refer to the same or similar elements throughout.

FIG. 1 shows a schematic diagram of a power supply apparatus with a soft-start function according to a first embodiment of the disclosure. The power supply apparatus with the soft-start function 100 of the embodiment may supply power to a load 190, such that the load 190 may normally operate. In the embodiment, the load 190 includes a voltage stabilizing unit 191 and a load unit 192 coupled in parallel. Wherein the voltage stabilizing unit 191 is, for example, a capacitor and has an effect of voltage stabilizing, and the load unit 192 is, for example, a motor controller, a motor or a server, or even a battery as load to be charged.

The power supply apparatus with the soft-start function 100 includes a power unit 110, a soft-start adjusting unit 120, a current detecting unit 130 and a controlling unit 140.

The power unit 110 generates a power voltage which could be under monitoring and known voltage. In the embodiment, the power unit 110 is, for example, a power supply or a battery or a charger, and generates a power voltage with a large power to provide to the load 190 to use.

The soft-start adjusting unit 120 is coupled to the power unit 110, receives the power voltage, a first controlling signal and a second controlling signal, and transforms the power voltage to a soft-start current according to the first controlling signal and the second controlling signal, so as to adjust and output the soft-start current to the voltage stabilizing unit 191 or output the power voltage to the voltage stabilizing unit 191. That is, for example, when the soft-start adjusting unit 120 starts the soft-start operation, the soft-start adjusting unit 120 may generate the soft-start current according to the first controlling signal and the second controlling signal of the controlling unit 140.

The current detecting unit 130 is coupled to the power unit 110 and suitable to couple to the voltage stabilizing unit 191, measures a current of a loop (i.e. a system loop) formed between the power unit 110 and the voltage stabilizing unit 191, so as to generate a current detecting signal. In the soft-start process, the current detecting signal may specifically reflect a state of the current between the power unit 110 and the voltage stabilizing unit 191.

The controlling unit 140 is coupled to the current detecting unit 130, receives the current detecting signal, so as to generate the first controlling signal, and the second controlling signal. That is, the controlling unit 140 generates the corresponding first controlling signal and the corresponding second controlling signal according to the state of the current in the current detecting signal, so as to control the operation of the soft-start adjusting unit 120, i.e. for example through a resistance inside the soft-adjusting unit, so as to generate the soft-start current, such that a working voltage established by the voltage stabilizing unit 190 may be quickly increased to a voltage value equivalent to the power voltage. In the embodiment, the controlling unit 140 is, for example, a micro controller or a microprocessor.

In the whole operation of the power supply apparatus with the soft-start function 100 and the load 190, firstly, the power unit 110 outputs the power voltage, and the working voltage on the voltage stabilizing unit 191 is not established at this time, such as 0V. The soft-start adjusting unit 120 generates, for example, an initial soft-start current predetermined by the resistor power rating according to the first controlling signal and the second controlling signal, such that the working voltage of the voltage stabilizing unit 191 is gradually established.

Then, the controlling unit 140 may perform a logic determination according to a monitoring result of the current detecting unit 130 to adjust the logic levels of the first controlling signal and the second controlling signal, so as to control that whether the soft-start adjusting unit 120 continues generating the soft-start current. That is, when the soft-start process is not finished, the soft-start adjusting unit 120 continues generating the soft-start current. When the soft-start process is finished, the soft-start adjusting unit 120 passes (turning On main power switch) the power voltage to the voltage stabilizing unit 191 and stop outputting the soft-start current. Additionally, the working voltage established by the voltage stabilizing unit 191 is provided to the load unit 192, such that the load unit 192 may normally operate.

According to the above description, the controlling unit 140 generates the first controlling signal and the second controlling signal according to the current detecting signal, so as to control the soft-start adjusting unit 120 to generate the soft-start current, such that the working voltage generated by the voltage stabilizing unit 191 is gradually increased to similar to the voltage value of the power voltage. Thus the soft-start process is finished, then the soft-start adjusting unit 120 is controlled to directly output the power voltage to the voltage stabilizing unit 191 which provides the working voltage to the load unit 192. Therefore, the soft-start process can reduce or limit the inrush current to happen, so as to increase circuit security.

Furthermore, the controlling unit 140 may further compare a current value of the current detecting signal from the current detecting unit 130 with a predetermined current value (ex. threshold of a short circuit current under soft-start process with the impedance of soft-start circuit) during soft-start process to identify if there is short circuit condition at the external circuit or load side, and generates a third controlling signal accordingly. For example, when the current value of the current detecting signal is less than the predetermined current value (i.e. the predetermined short circuit current value) under soft-start process, it indicates that a short circuit does not occur, and thus the controlling unit 140 generates, for example, the third controlling signal with low logic level; when the current value of the current detecting signal is greater than the predetermined current value (i.e. the predetermined short circuit current value) under soft-start process, it indicates that a short circuit occurs, the controlling unit 140 generates, for example, the third controlling signal with high logic level.

The above approach indicates an external short circuit detection mechanism during soft-start process under known power unit voltage, soft-start impedance and the predetermined current value before turning on the main power switch. Thus this approach can pre-detect external short circuit condition during soft-start process and stop turning on the soft-start adjusting unit 120 (with the main power switch) to avoid the real short circuit condition happening.

That is, when there is a damaged or short-circuit load apparatus (i.e. the load 190) connected to the power supply apparatus with the soft-start function 100, the controlling unit 140 can do an pre-detection of "external system loop impedance" before deciding to turn on the main power switch in the soft-start adjusting unit 120 or not. If the controlling unit 140 (with the pre-detection mechanism) finds out these is external short circuit exist in the whole system, the soft-start adjusting unit 120 (including the main power switch) will not be turned on, and this can avoid the short circuit condition happening.

Further, the power supply apparatus with the soft-start function 100 includes a displaying unit 150. The displaying unit 150 is coupled to the controlling unit 140, receives the third controlling signal generated by the controlling unit 140 to display the third controlling signal. Wherein the displaying unit 150 is, for example, an indicator light. For example, when the displaying unit 150 receives the third controlling signal with low logic level, the displaying unit 150 does not light. Thus it indicates that the circuit does not occur the short circuit. When the displaying unit 150 receives the third controlling signal with high logic level, the displaying unit 150 lights. Thus it indicates that the circuit occurs the short circuit, thereby notifying the user to perform a subsequent repair process for the power supply apparatus with the soft-start function 100 or the load 190 thereof. Therefore, the embodiment may further display whether the short circuit occurs in the circuit, thereby increasing safety of the use of the power supply apparatus with the soft-start function 100 or the whole system.

Additionally, the power supply apparatus with the soft-start function 100 further includes a voltage detecting unit 160. The voltage detecting unit 160 is coupled to the controlling unit 140 and suitable to couple to the voltage stabilizing unit 191 in parallel (i.e. couple to two terminals of the voltage stabilizing unit 191), measures the working voltage on the voltage stabilizing unit 191, so as to generate the voltage detecting signal to the controlling unit 140, thereby performing a subsequent process. In the soft-start process, the voltage detecting signal may specifically reflect a state of the established working voltage on the voltage stabilizing unit 191. Further, in the embodiment, in the soft-start process, the controlling unit 140 may monitor the established working voltage on the voltage stabilizing unit 191 according to the voltage detecting signal provided by the voltage detecting unit 160, such that the controlling unit 140 may generate the first controlling signal and the second controlling signal to control the soft-start adjusting unit 120 according to the current detecting signal and the voltage detecting signal at the same time, so as to adjust the output of the soft-start current. In another embodiment, after the soft-start is finished, the voltage detecting unit 160 may continue to monitor the power voltage of the power unit 110 or the output end, and the controlling unit 140 may output other over voltage or under voltage protection signals depending on the circumstances.

Furthermore, in the embodiment shown in FIG. 1, the soft-start adjusting unit 120 is configured to couple to a positive terminal of the power unit 110 and the current detecting unit 130 is configured to couple to a negative terminal of the power unit 110, but it is not limited to the disclosure. The soft-start adjusting unit 120 and the current detecting unit 130 may change the configuration position, i.e. the soft-start adjusting unit 120 is configured to couple to a negative terminal of the power unit 110 and the current detecting unit 130 is configured to couple to a positive terminal of the power unit 110, and the same efficiency is also achieved. The embodiment of the system structure after changing may still refer to the description of FIG. 1, and the description thereof is omitted.

Figure 2:
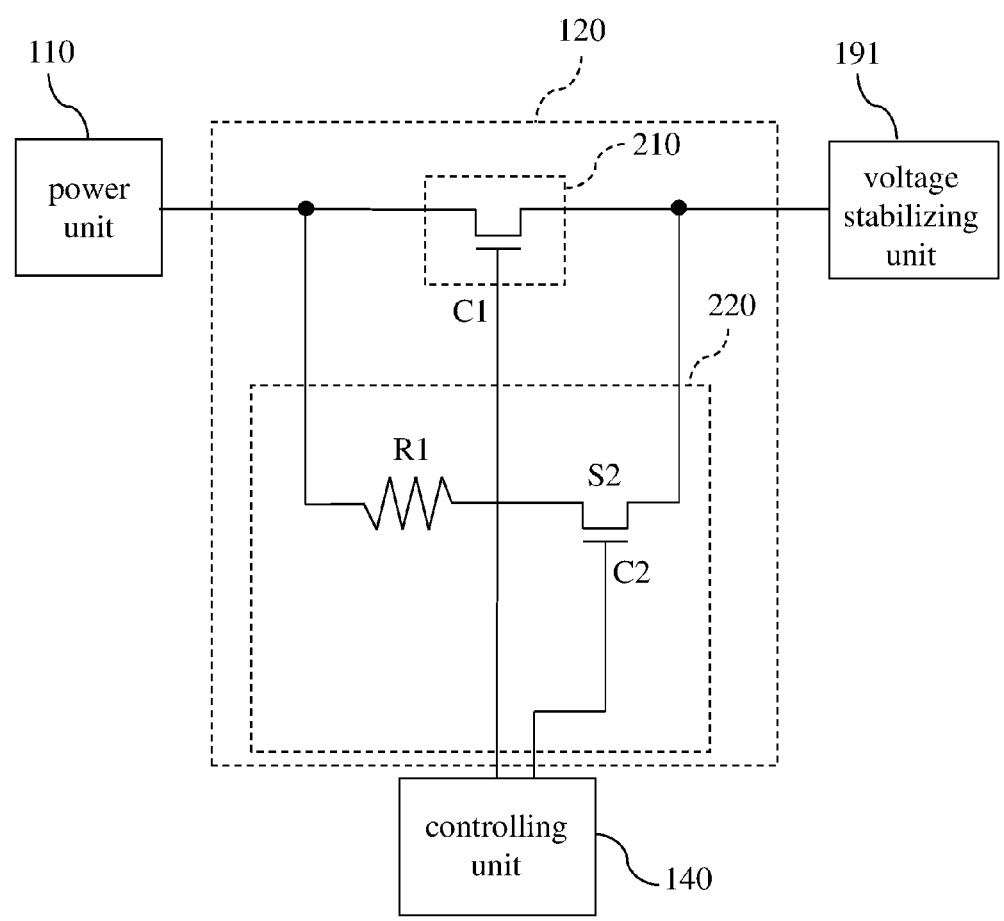
FIG. 2 shows a detailed circuit diagram of a soft-start adjusting unit according to a second embodiment of the disclosure.

FIG. 2 shows a detailed circuit diagram of a soft-start adjusting unit according to a second embodiment of the disclosure. The soft-start adjusting unit 120 includes a first switching unit 210 (which is the main power switch) and a current adjusting unit 220.

The first switching unit 210 is coupled to the power unit 110 and the controlling unit 140 and suitable to couple to the voltage stabilizing unit 191, receives the power voltage and the first controlling signal, and outputs or stops outputting the power voltage to the voltage stabilizing unit 191 according to the first controlling signal.

The current adjusting unit 220 is coupled to the controlling unit 140 and coupled to the first switching unit 210 in parallel, receives the power voltage and the second controlling signal, and transforms the power voltage to the soft-start current to generate the soft-start current to the voltage stabilizing unit 191.

Further, the current adjusting unit 220 includes a first resistor R1 and a second switching unit S2. The first resistor R1 has a first terminal and a second terminal, the first terminal of the first resistor R1 is coupled to the power unit 110.

The second switching unit S2 is coupled to the second terminal of the first resistor R1, the controlling unit 140 and the voltage stabilizing unit 191, and receives the second controlling signal C2. The second switching unit S2 receives a second controlling signal C2, so as to conduct or does not conduct according to a control of the second controlling signal C2.

The second switching unit S2 is a MOSFET, such as a P-type MOSFET. A first terminal of the second switching unit S2 (i.e. a gate of the P-type MOSFET) receives the second controlling signal C2, a second terminal of the second switching unit S2 (i.e. a source of the P-type MOSFET) is coupled to the first resistor R1, and a third terminal of the second switching unit S2 (i.e. a drain of the P-type MOSFET) is coupled to the voltage stabilizing unit 191. In another embodiment, the second switching unit S2 may also be implemented by a N-type MOSFET.

Additionally, in the embodiment, the first switching unit 210 is a MOSFET, such as a P-type MOSFET. A first terminal of the first switching unit 210 (i.e. a gate of the P-type MOSFET) receives the first controlling signal C1, a second terminal of the first switching unit 210 (i.e. a source of the P-type MOSFET) is coupled to the power unit 110, and a third terminal of the first switching unit 210 (i.e. a drain of the P-type MOSFET) is coupled to the voltage stabilizing unit 191. Further, the first switching unit 210 is a MOSFET with large power.

In the whole operation, when the power supply apparatus with the soft-start function 100 starts to work, the controlling unit 140 generates, for example, the first controlling signal C1 with high logic level and the second controlling signal C2 with low logic level, such that the first switching unit 210 does not conduct and the second switching unit S2 conducts. Thus a path flowed by the soft-start current is the first resistor R1 and the second switching unit S2, such that the working voltage on the voltage stabilizing unit 191 may be increased to a voltage value close to the power voltage.

Then, when the working voltage of the voltage stabilizing unit 191 is close to or almost equal to the power voltage, the controlling unit 140 generates, for example, the controlling signal C1 with low logic level to turn on the first switching unit 210, such that the first switching unit 210 conducts, and generates, for example, the second controlling signal C2 with high logic level, such that the second switching unit S2 does not conduct to turn off the current adjusting unit 220. Thus the soft-start process is finished, such that the power unit 100 is connected to voltage stabilizing unit 191 directly to provide working voltage to the load unit 192. Therefore, the soft-start current works within the allowed maximum value by the power rating of the resistor through the resistor inside the current adjusting unit 220. The soft-start current gradually establishes the working voltage on the voltage stabilizing unit 191. When the working voltage on the voltage stabilizing unit 191 is close to or almost equal to the voltage value of the power voltage, the first switching unit 210 is allowed to conduct, thereby avoiding generating an inrush current that could damage the circuit function, so as to increase the circuit security.

Further, in other embodiments, the soft-start adjusting unit 120 further transforms the power voltage to the soft-start current according to the first controlling signal, the second controlling signal and a plurality of fourth controlling signals, so as to adjust and output the soft-start current to the voltage stabilizing unit 191 or output the power voltage to the voltage stabilizing unit 191. That is, the soft-start adjusting unit 120 is controlled by the first controlling signal, a second controlling signal and the fourth controlling signal, so as to adjust a magnitude of the soft-start current. For example, when the soft-start adjusting unit 120 starts the soft-start operation, the soft-start adjusting unit 120 may dynamically control the current value of the soft-start current according to the first controlling signal, the second controlling signal and the fourth controlling signals of the controlling unit 140.

The controlling unit 140 may further receive the current detecting signal, so as to generate the first controlling signal, the second controlling signal and the fourth controlling signals. That is, the controlling unit 140 generates the corresponding first controlling signal, the corresponding second controlling signal and the corresponding fourth controlling signals according to the state of the current in the current detecting signal, so as to control the soft-start adjusting unit 120 to adjust a magnitude of the soft-start current value, i.e. for example those series resistors inside the soft-start adjusting unit 120 is gradually decreased. Thus the soft-start current can be maintained at or close to the allowed maximum value by the power rating of the series resistors, such that the working voltage on the voltage stabilizing unit 190 can be established quickly.

In the whole operation of the power supply apparatus with the soft-start function 100 and the load 190, firstly, the power unit 110 outputs the power voltage, and the working voltage on the voltage stabilizing unit 191 is not established at this time, such as 0V. The soft-start adjusting unit 120 generates, for example, an initial soft-start current predetermined by the power rating of those series resistors according to the first controlling signal, the second controlling signal and the fourth controlling signals.

With the working voltage of the voltage stabilizing unit 191 is gradually established, the soft-start current may be lowered since a voltage difference between power voltage and the working voltage of the voltage stabilizing unit 191 is decreased. Then, the controlling unit 140 performs a logic determination according to the monitoring result of the current detecting unit 130 to generate the first controlling signal, the second controlling signal and the fourth controlling signals with different logic levels in sequence, so as to control the soft-start adjusting unit 120 to dynamically adjust the soft-start current. That is, the resistance value of the series resistors inside the soft-start adjusting unit 120 is controlled to decrease, so as to increase the current value of the soft-start current to a current value allowed by the power rating of the series resistors correspondingly existing in a soft-start loop. Additionally, the working voltage established on the voltage stabilizing unit 191 can further increased quickly to reduce the period of soft-start time.

According to the above description, the controlling unit 140 generates the first controlling signal, the second controlling signal and the fourth controlling signals according to the current detecting signal, so as to control the soft-start adjusting unit 120 to adjust the magnitude of the soft-start current, such that the working voltage on the voltage stabilizing unit 191 is gradually increased to equal to or close to the voltage value of the power voltage. Thus the soft-start process is finished, the soft-start adjusting unit 120 is controlled to directly output the power voltage to the voltage stabilizing unit 191 for the load unit 192. Therefore, the soft-start process can avoid generating inrush current to increase the circuit security.

Further, in the embodiment, in the soft-start process, the controlling unit 140 may monitor the working voltage established on the voltage stabilizing unit 191 according to the voltage detecting signal provided by the voltage detecting unit 160, such that the controlling unit 140 may generate the first controlling signal, the second controlling signal and the fourth controlling signals to control the soft-start adjusting unit 120 according to the current detecting signal and the voltage detecting signal at the same time, so as to adjust the output of the soft-start current. In another embodiment, after the soft-start is finished, the voltage detecting unit 160 may continue to monitor the power voltage of the power unit 110 and output end, and the controlling unit 140 may output other over voltage or under voltage protection signals depending on the circumstances.

Figure 3:
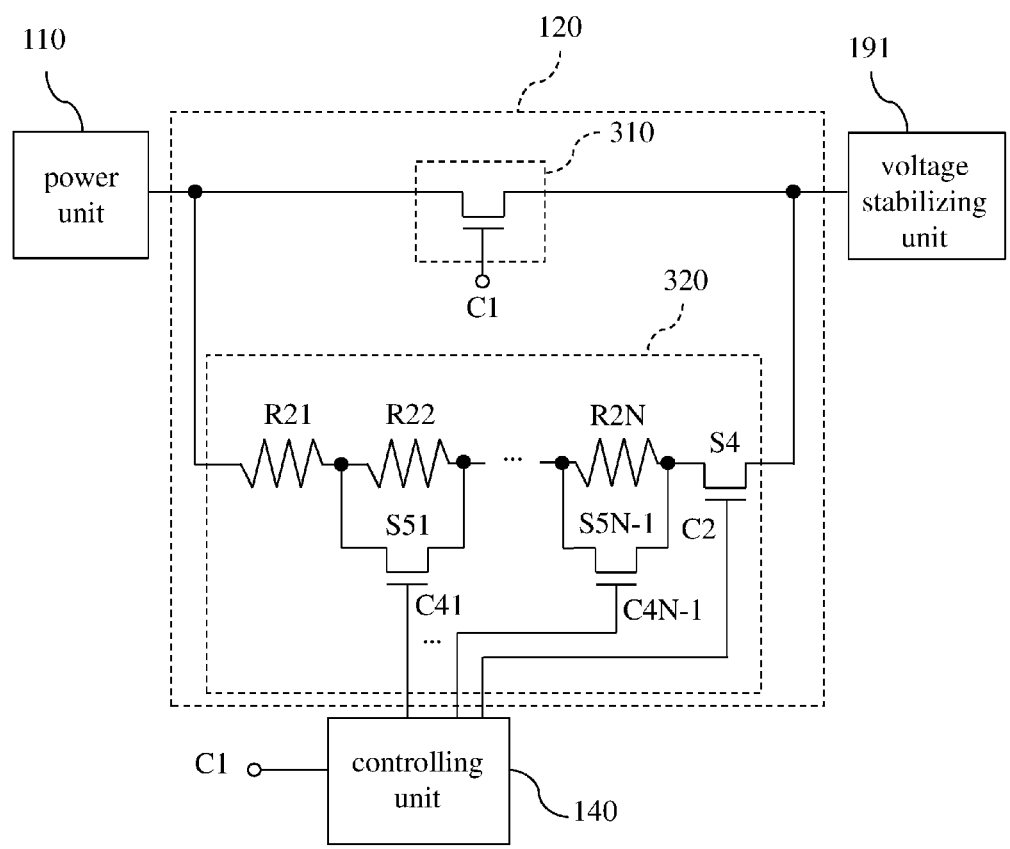
FIG. 3 shows a detailed circuit diagram of a soft-start adjusting unit according to a third embodiment of the disclosure.

FIG. 3 shows a detailed circuit diagram of a soft-start adjusting unit according to a third embodiment of the disclosure. The soft-start adjusting unit 120 includes a third switching unit 310 and a current adjusting unit 320.

The third switching unit 310 is coupled to the power unit 110 and the controlling unit 140 and suitable to couple to the voltage stabilizing unit 191, receives the power voltage and the first controlling signal, and outputs the power voltage to the voltage stabilizing unit 191 according to the first controlling signal.

The current adjusting unit 320 is coupled to the controlling unit 140 and coupled to the third switching unit 310 in parallel, receives the power voltage, the second controlling signal and the fourth controlling signals, and transforms the power voltage to the soft-start current to adjust and output the soft-start current to the voltage stabilizing unit 191.

Further, the current adjusting unit 320 includes N second resistors R21, R22, . . . , R2N, a fourth switching unit S4 and (N−1) fifth switching units S51, S52, . . . , S5N−1, wherein N is a positive integer greater than 1.

N second resistors R21, R22, . . . , R2N are sequentially coupled in series, wherein the first resistor of the N second resistors R21 is coupled to the power unit 110. That is, a first terminal of the second resistor R21 is coupled to the power unit 110, a second terminal of the second resistor R21 is coupled to a first terminal of the second resistor R22, a second terminal of the second resistor R22 is coupled to a first terminal of the second resistor R23, . . . , a second terminal of the second resistor R2N−1 is coupled to a first terminal of the second resistor R1N.

The fourth switching unit S4 is coupled to the Nth resistor of the second resistors R2N, the controlling unit 140 and the voltage stabilizing unit 191, receives the second controlling signal C2. That is, the fourth switching unit S4 is coupled to a second terminal of the second resistor R2N. The fourth switching unit S4 receives the second controlling signal C2. Thus the fourth switching unit S4 conducts or does not conduct according to a control of the second controlling signal C2.

The fourth switching unit S4 is a MOSFET, such as a P-type MOSFET. A first terminal of the fourth switching unit S4 (i.e. a gate of the P-type MOSFET) receives the second controlling signal C2, a second terminal of the fourth switching unit S4 (i.e. a source of the P-type MOSFET) is coupled to Nth resistor of the second resistors R2N, and a third terminal of the fourth switching unit S4 (i.e. a drain of the P-type MOSFET) is coupled to the voltage stabilizing unit 191. In another embodiment, the fourth switching unit S4 may also be implemented by a N-type MOSFET.

The i-th fifth switching unit S51, S52, ..., S5N−1 and (i+1)-th second resistor R21, R22, ..., R2N are coupled in parallel, (N−1) fifth switching units are coupled to the controlling unit 140, so as to receive the fourth controlling signals, wherein 0<i≤N−1. That is, 1-st fifth switching unit S51 and 2-nd second resistor R22 are coupled in parallel, 2-nd fifth switching unit S52 and 3-rd second resistor R23 are coupled in parallel, ..., (N−1)-th fifth switching unit S5N and Nth resistor of the second resistors R2N are coupled in parallel. (N−1) fifth switching units S51, S52, ..., S5N−1 are coupled to the controlling unit 140, receive the fourth controlling signals C41, C42, ..., C4N−1. Thus the fifth switching units S51, S52, ..., S5N−1 conduct or do not conduct according to controls of the fourth controlling signals C41, C42, ..., C4N−1. Wherein a quantity of the fourth controlling signals corresponds to a quantity of the fifth switching units.

In the embodiment, each of (N−1) fifth switching units S51, S52, ..., S5N−1 is a MOSFET, such as a P-type MOSFET. A first terminal of each of (N−1) fifth switching units S51, S52, ..., S5N−1 (i.e. a gate of the P-type MOSFET) receives the corresponding fourth controlling signal C41, C42, ..., C4N−1, a second terminal of each of (N−1) fifth switching units S51, S52, ..., S5N−1 (i.e. a source of the P-type MOSFET) is coupled to a first terminal of (i+1)-th second resistor R22, R23, ..., R2N, and a third terminal of each of (N−1) fifth switching units S51, S52, ..., S5N−1 (i.e. a drain of the P-type MOSFET) is coupled to a second terminal of (i+1)-th second resistor R22, R23, ..., R2N. In another embodiment, the fifth switching units S51, S52, ..., S5N−1 may also be implemented by a N-type MOSFET.

Additionally, in the embodiment, the third switching unit 310 is a MOSFET, such as a P-type MOSFET. A first terminal of the third switching unit 310 (i.e. a gate of the P-type MOSFET) receives the first controlling signal C1, a second terminal of the third switching unit 310 (i.e. a source of the P-type MOSFET) is coupled to the power unit 110, and a third terminal of the third switching unit 310 (i.e. a drain of the P-type MOSFET) is coupled to the voltage stabilizing unit 191. Further, the first switching unit 210 is a MOSFET with large power as normally the main power switch.

In the whole operation, when the power supply apparatus with the soft-start function 100 starts to work, the controlling unit 140 generates, for example, the first controlling signal C1 with high logic level, the second controlling signal C2 with low logic level and the fourth controlling signals C41, C42, ..., C4N−1 with high logic levels, such that the third switching unit 310 does not conduct, the fourth switching unit S4 conducts, and the fifth switching units S51, S52, ..., S5N−1 do not conduct. Thus a path flowed by the soft-start current is the second resistor R21, the second resistor R22, ..., the second resistor R2N and the fourth switching unit S4. Then, the controlling unit 140 maintains the first controlling signal C1 and the fourth controlling signal C42, ..., C4N−1 at high logic level and maintains the second controlling signal C2 at low logic level, and changes fourth controlling signal C41 from high logic level to low logic level, such that the fourth switching unit S4 and the fifth switching unit S51 conduct. Thus a path flowed by the soft-start current is the second resistor R21, the fifth switching unit S51, the second resistor R23, ..., the second resistor R2N and the fourth switching unit S4.

Afterward, the controlling unit 140 maintains the first controlling signal C1 and the fourth controlling signals C43, ..., C4N−1 at high logic level and maintains the second controlling signal C2 and the fourth controlling signal C41 at low logic level, and changes the fourth controlling signal C42 from high logic level to the low high level, such that the fourth switching unit S4 and the fifth switching units S51 and S52 conduct. Thus a path flowed by the soft-start current is the second resistor R21, the fifth switching unit S51, the fifth switching unit S52, the second resistor R24, ..., the second resistor R2N and the fourth switching unit S4.

Then, the controlling unit 140 changes the remaining fourth controlling signals C43, C44, ..., C4N−1 from high logic level to low logic level in sequence until the fourth controlling signal C4N−1 is changed from high logic level to low logic level. That is, when the controlling unit 140 changes all the fourth controlling signals C41, C42, ..., C4N−1 from high logic level to low logic level, a path flowed by the soft-start current is the second resistor R21, the fifth switching units S51, S52, ..., S5N−1 and the fourth switching unit S4, such that the working voltage on the voltage stabilizing unit 191 can be increased to a voltage value close to the power voltage.

Then, when the working voltage of the voltage stabilizing unit 191 is close to or almost equal to the power voltage generated by the power unit 110, the controlling unit 140 generates, for example, the controlling signal C1 with low logic level to turn on the third switching unit 310, such that the third switching unit 310 conducts, and generates, for example, the second controlling signal C2 and the fourth controlling signals C41, C42, ..., C4N−1 with high logic levels, such that the fourth switching unit S4 and the fifth switching units S51, S52, ..., S5N−1 do not conduct and turn off the current adjusting unit 320. Thus the soft-start process is finished, such that the voltage stabilizing unit 191 can establish the working voltage to close or equal to the power voltage to the load unit 192. Therefore, under an appropriate control of the controlling unit 140, those series resistors inside the current adjusting unit 320 is gradually decreased to maintain the soft-start current within the maximum value allowed by the power rating of those series resistors, so as to effectively shortening the time of the soft-start process, such that the working voltage established on the voltage stabilizing unit 191 is quickly to close or equal to the voltage value of the power voltage, thereby avoiding generating an inrush current to damage a circuit function, so as to increase the circuit security.

Figure 4:
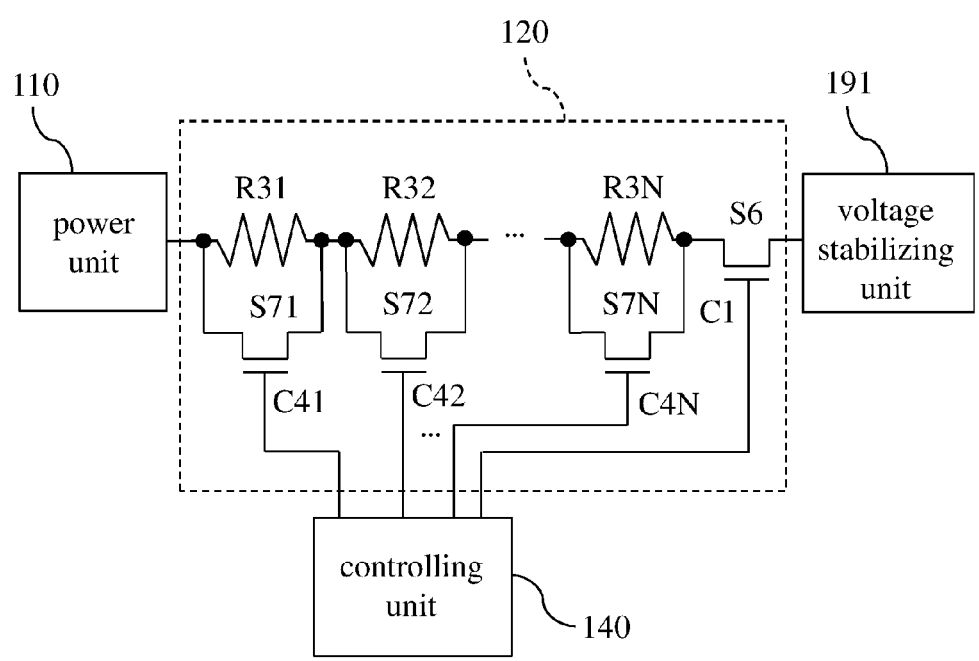
FIG. 4 shows a detailed circuit diagram of a soft-start adjusting unit according to a fourth embodiment of the disclosure.

FIG. 4 shows a detailed circuit diagram of a soft-start adjusting unit according to a fourth embodiment of the disclosure. The amount of the second controlling signal is N, N is a positive integer greater than or equal to 1. The soft-start adjusting unit 120 includes N third resistors R31, R32, ..., R3N, a sixth switching unit S6, and N seventh switching units S71, S72, ..., S7N.

N third resistors R31, R32, ..., R3N are sequentially coupled in series, wherein the third second resister R31 is coupled to the power unit 110. That is, a first terminal of the third resistor R31 is coupled to the power unit 110, a second terminal of the third resistor R31 is coupled to a first terminal of the third resistor R32, a second terminal of the third resistor R32 is coupled to a first terminal of the third resistor R33, . . . , a second terminal of the third resistor R3N−1 is coupled to a first terminal of the third resistor R3N.

The sixth switching unit S6 is coupled to N-th third resistor R3N, the controlling unit 140 and the voltage stabilizing unit 191, receives the first controlling signal C1. That is, the sixth switching unit S6 is coupled to a second terminal of the third resistor R3N. The sixth switching unit S6 receives the first controlling signal C1. Thus the sixth switching unit S6 conducts or does not conduct according to a control of the first controlling signal C1.

The sixth switching unit S6 is a MOSFET, such as a P-type MOSFET. A first terminal of the sixth switching unit S6 (i.e. a gate of the P-type MOSFET) receives the first controlling signal C1, a second terminal of the sixth switching unit S6 (i.e. a source of the P-type MOSFET) is coupled to N-th third resistor R3N, and a third terminal of the sixth switching unit S6 (i.e. a drain of the P-type MOSFET) is coupled to the voltage stabilizing unit 191. In another embodiment, the sixth switching unit S6 may also be implemented by a N-type MOSFET.

The i-th seventh switching unit S71, S72, . . . , S7N and the i-th third resistor R31, R32, . . . , R3N are coupled in parallel. That is, the seventh switching unit S71 and the third resistor R31 are coupled in parallel, the seventh switching unit S72 and the third resistor R32 are coupled in parallel, . . . , the seventh switching unit S7N and the third resistor R3N are coupled in parallel. The seventh switching units S71, S72, . . . , S7N are coupled to the controlling unit 140, so as to receive the second controlling signals C41, C42, . . . , C4N. Thus the seventh switching units S71, S72, . . . , S7N conduct or do not conduct according to controls of the second controlling signals C41, C42, . . . , C4N.

In the embodiment, each of N seventh switching units S71, S72, . . . , S7N is a MOSFET, such as a P-type MOSFET. A first terminal of each of N seventh switching units S71, S72, . . . , S7N (i.e. a gate of the P-type MOSFET) receives the corresponding second controlling signal C41, C42, . . . , C4N, a second terminal of each of N seventh switching units S71, S72, . . . , S7N (i.e. a source of the P-type MOSFET) is coupled to a first terminal of i-th third resistor R31, R32, . . . , R3N, and a third terminal of each of N seventh switching units S71, S72, . . . , S7N (i.e. a drain of the P-type MOSFET) is coupled to a second terminal of i-th third resistor R31, R32, . . . , R3N. In another embodiment, the seventh switching units S71, S72, . . . , S7N may also be implemented by a N-type MOSFET.

In the whole operation, when the power supply apparatus with the soft-start function 100 starts to work, the controlling unit 140 generates, for example, the first controlling signal C1 with low logic level and the second controlling signals C41, C42, . . . , C4N with high logic levels, such that the sixth switching unit S6 (P-type MSFET) is conducted, the seventh switching units S71, S72, . . . , S7N are not conducted. Thus a path flowed by the soft-start current is the third resistor R31, the third resistor R32, . . . , the third resistor R3N and the sixth switching unit S6. Then, the controlling unit 140 maintains the first controlling signal C1 at low logic level and maintains the second controlling signals C42, . . . , C4N at high logic level, and changes the second controlling signal C41 from high logic level to low logic level, such that the sixth switching unit S6 and the seventh switching unit S71 is conducted. Thus a path flowed by the soft-start current is the seventh switching unit S71, the third resistor R32, the third resistor R33, . . . , the third resistor R3N and the sixth switching unit S6.

Afterward, the controlling unit 140 maintains the first controlling signal C1 and the second controlling signal C41 at low logic level and maintains the second controlling signals C43, . . . , C4N at a high logic level, and changes the second controlling signal C42 from the high logic level to the low high level, such that the sixth switching unit S6 and the seventh switching units S71 and S72 are conducted. Thus a path flowed by the soft-start current is the seventh switching unit S71, the seventh switching unit S72, the third resistor R33, . . . , the third resistor R3N and the sixth switching unit S6.

Then, the controlling unit 140 changes the remaining second controlling signals C43, . . . , C4N−1 from high logic level to low logic level in sequence until the second controlling signal C4N−1 is changed from high logic level to low logic level. That is, when the controlling unit 140 changes all the second controlling signal C41, C42, . . . , C4N−1 from high logic level to low logic level, a path flowed by the soft-start current is the seventh switching units S71, S72, . . . , S7N−1, the third resistor R3N and the sixth switching unit S6.

Then, when the working voltage of the voltage stabilizing unit 191 is close to or almost equal to the power voltage generated by the power unit 110, the controlling unit 140 changes the second controlling signal C4N from high logic level to low logic level to turn on the seventh switching unit S7N. Thus the soft-start process is finished, such that the voltage stabilizing unit 191 may establish working voltage to close or equal to the power voltage to the load unit 192. Therefore, those series resistors inside the soft-start adjusting unit 120 is gradually decreased to maintain the soft-start current at the maximum value allowed by the power rating of those series resistor, such that the working voltage established on the voltage stabilizing unit 191 is equal to the voltage value of the power voltage, thereby avoiding generating an inrush current to damage a circuit function, so as to increase the circuit security.

Figure 5:
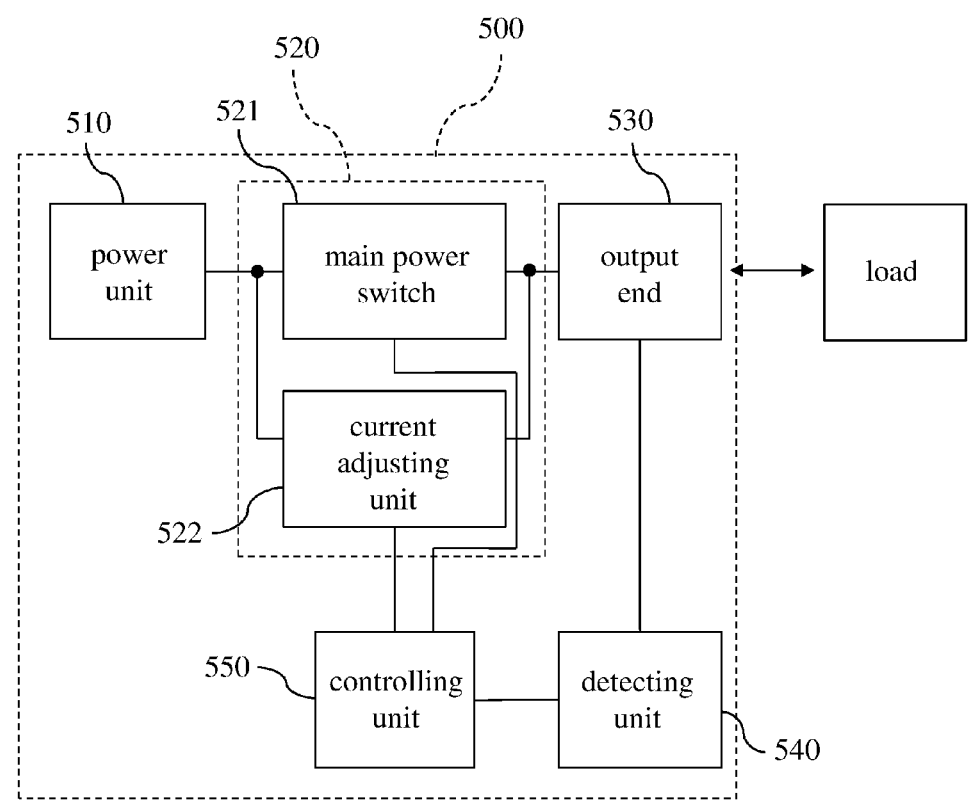
FIG. 5 shows a schematic diagram of a power supply apparatus with a protection mechanism according to a fifth embodiment of the disclosure.

FIG. 5 shows a schematic diagram of a power supply apparatus with a protection mechanism according to a fifth embodiment of the disclosure. The power supply apparatus with the protection mechanism 500 includes a power unit 510, a soft-start adjusting unit 520, an output end 530, a detecting unit 540 and a controlling unit 550.

The power unit 510 generates a power voltage. In the embodiment, the power unit 510 is, for example, a power supply or a battery or a charger, and may provide a power voltage with a large power to provide to the load to use.

The soft-start adjusting unit 520 is coupled to the power unit 510, receives the power voltage and a plurality of controlling signals, and transforms the power voltage to a soft-start current according to the controlling signals, so as to adjust and output the soft-start current or output the power voltage. That is, the soft-start adjusting unit 520 is controlled by the controlling signals, so as to adjust a magnitude of the soft-start current or directly output or stop outputting the power voltage.

Further, the soft-start adjusting unit 520 includes a main power switch 521 and a current adjusting unit 522. The main power switch 521 is coupled to the power unit 510, the controlling unit 550 and the output end 530. The current adjusting unit 522 is coupled to the controlling unit 550 and is coupled to the main power switch 521 in parallel. For example, when the soft-start adjusting unit 520 starts to operate the soft-start process, the controlling unit 550 can control the current adjusting unit 522 to dynamically control the current value of the soft-start current according to different controlling signals, and control the main power switch 521 to turn-off. Alternatively, when the soft-start process is finished, the main power switch 521 turns on and directly output the power voltage, and the operation of the current adjusting unit 522 is turned off. Alternatively, during the soft-start process, if the controlling unit 550 discovers that the soft-start process fails and does not finished normally, such as the short circuit from external circuit or outside load, and then the controlling unit 550 turns off the main power switch 521 and the operation of the current adjusting unit 522, i.e. the output of the power voltage is turned off at output end.

The output end 530 is coupled to the soft-start adjusting unit 520 and suitable to output the soft-start current or the power voltage. The output end 530 is also suitable to connect to the load, so as to output the soft-start current or the power voltage to the load.

The detecting unit 540 is coupled to the output end 530 and detects a current state and/or a voltage state of the output end 530, so as to generate detecting signals. Wherein the current state and/or the voltage state of the output end 530 includes, for example, the current value of the soft-start current and/or a voltage value of the output end 530, and some detecting signals/events generated by voltage and/or current protection circuits (such as an overcurrent or a short circuit). For example, the detecting signals/events of the protection circuit with overcurrent or short circuit protection is generated when the output end 530 is connected to the load after the power supplying apparatus with the protection mechanism 500 already operates.

The controlling unit 550 is coupled to the detecting unit 540 and the soft-start adjusting unit 520, receives the detecting signal, so as to generate the controlling signals. That is, when the controlling unit 550 receives the detecting signal, the controlling unit 550 may determine an operation of the power supplying apparatus with the protection mechanism 500 to correspondingly generate the controlling signals according to the current operation situation or state of the system (such as the power supplying apparatus with the protection mechanism 500), i.e. the change of the current value and/or the voltage value, and those input of the detecting signals/events generated by voltage and/or current protection circuits. The above operation state includes, for example, whether the soft-start operation of the soft-start adjusting unit 520 is finished, whether the output end 530 is connected to the load when the power supplying apparatus with the protection mechanism 500 is already operated, or whether a condition for triggering the short circuit protection is activated when the power supplying apparatus with the protection mechanism 500 detects a load current for the first time.

In the whole operation, assuming that the power supplying apparatus with the protection mechanism 500 is certainty connected to the load, i.e. the output end 530 is connected to the load. The user start operating the power supplying apparatus with the protection mechanism 500, and then the controlling unit 550 generates the controlling signals to the soft-start adjusting unit 520, so as to perform the soft-start operation. That is, the soft-start adjusting unit 520 can be controlled to adjust and output the soft-start current, and the soft-start current is outputted to the load through the output end 530. Then, the detecting unit 540 may detect the current state and/or the voltage state of the output end 530, so as to accordingly generate the detecting signals to the controlling unit 550, such that the controlling unit 550 performs a corresponding subsequent process, thereby achieving the effect of monitoring and protection.

During the soft-start process, the controlling unit 550 continues to monitor whether the current value of the soft-start current outputted by the output end 530 is normal through the detecting unit 540. When the detected current value of the soft-start current outputted by the output end 530 is normal, the controlling unit 550 may, for example, generate corresponding controlling signals to control the soft-start adjusting unit 520 for adjusting the magnitude of the corresponding soft-start current, such that the working voltage of the load is gradually increased to equal to or close to the voltage value of the power voltage. When the soft-start process is finished, the controlling unit 550 can generate the corresponding controlling signal to the soft-start adjusting unit 520, so as to directly output the power voltage to the load.

Additionally, during the soft-start process, if the current value of the detecting signals generated by the detecting unit 540 is not the value of the expected soft start current, and the current value is greater than a predetermined soft-start current value, it indicates that the circuit may have short circuit issue. After a predetermined monitoring time, when the controlling unit 550 determines that the current value of the received detecting signal thereof is still greater than the predetermined current value, it indicates that the system circuit has short circuit issue. Then, the controlling unit 550 generates the corresponding controlling signals, such that the power supplying apparatus with the protection mechanism 500 stops outputting the soft-start current or is fully turned off, or generates an alarm to indicates that the circuit has short circuit issue, so as to inform the user to perform a subsequent repairing process for the power supplying apparatus of the protection mechanism 500 or the load thereof.

In another embodiment, this embodiment describes that the power supplying apparatus with the protection mechanism 500 is not connected to the load when it starts to operate, i.e. the output end 530 is not connected to the load. The user starts operating the start switch of the power supplying apparatus with the protection mechanism 500, the controlling unit 550 controls the soft-start adjusting unit 520 to perform the soft-start process. Then, the controlling unit 550 continues to monitor whether the current state and/or the voltage state of the output end 530 is normal through the detecting unit 540, and the controlling unit 550 may discover that the output end 530 is not connected to the load. At this time, the controlling unit 550 may return to an initial state of the soft-start process, i.e. the main power switch 521 is not turned on, only a current limited path with the resistance of the soft-start process is started and enabled, and it waits to connect to the load, so as to re-perform the soft-start process when the load is connected. When a waiting time exceeds a predetermined "idle time" without load connected, the controlling unit 550 generates the corresponding controlling signals, such that the power supplying apparatus with the protection mechanism 500 can be fully turned off and the power consumption is saved.

In another situation, when the waiting time does not exceed the predetermined "idle time" without load connected, the user connects the load to the power supplying apparatus with the protection mechanism 500, i.e. the load is connected to the output end 530. Since the power supplying apparatus with the protection mechanism 500 is already in the initial state of the soft-start process, the detecting unit 540 can detect the soft-start current value from the detecting unit 540 when the load is connected. Thus the controlling unit 550 can generate the corresponding controlling signals, so as to finish the soft-start process and monitor that the soft-start process is normal. If the soft-start current value is greater than the predetermined soft-start current value of the controlling unit 550, it indicates that the circuit is short-circuited. Then, the controlling unit 550 generates the corresponding controlling signals, such that the power supplying apparatus with the protection mechanism 500 stops outputting the soft-start current or is fully turned off, or generates an alarm to indicates that the circuit is the short-circuited, so as to inform the user to perform a subsequent repairing process for the power supplying apparatus of the protection mechanism 500 or the load thereof.

In another situation, assuming that the power supplying apparatus with the protection mechanism 500 is not connected to the load, i.e. the output end 530 is not connected to the load. The user starts operating the power supplying apparatus with the protection mechanism 500, such that the controlling unit 550 controls the soft-start adjusting unit 520 to perform the soft-start process, so as to finish the soft-start process, and controls the main power switch 521 to turns on to directly output the power voltage. Then, the controlling unit 550 continues to monitor that the current state and/or the voltage state of the output end 530 is normal or not through the detecting unit 540, and waits to connect to the load. When the waiting time exceeds the predetermined "idle time" without load connected, the controlling unit 550 generates the corresponding controlling signals, such that the power supplying apparatus with the protection mechanism 500 can be fully turned off and the power consumption is saved.

In another situation, when the waiting time does not exceed the predetermined "idle time" without load connected, the user connects the load to the power supplying apparatus with the protection mechanism 500, i.e. the load is connected to the output end 530. Since the power supplying apparatus with the protection mechanism 500 already finishes the soft-start process and the main power switch 521 is turned on, and the detecting unit 540 continues to detect the current state and/or the voltage state of the output end 530 and generate the detecting signals to the controlling unit 550, so as to perform a subsequent process. Then, when the current value of the detecting signals generated by the detecting unit 540 is suddenly increased, and the current value is greater than a predetermined short circuit current value of the controlling unit 550 during soft-start process, it indicates that the circuit may have the inrush current or have the short circuit issue. At this time, the controlling unit 550 may starts the short circuit protection, turns off the main power switch 521, and then re-starts the soft-start process to limit the inrush current or perform the protection of the short circuit.

Afterward, during the re-start of the soft-start process, the controlling unit 550 may continue to monitor the current value of the detecting signals generated from the detecting unit 540. If the current value of the detecting signal is smaller than the predetermined soft-start current value, it indicates that the circuit is not short-circuited, i.e. the above current value increased suddenly is an instantaneous inrush current. Then, the controlling unit 550 generates the corresponding controlling signal, so as to control the soft-start adjusting unit 520 to continue performing the soft-start process. During the re-start of soft-start process, if the current value of the detecting signals generated from the detecting unit 540 is greater than the predetermined soft-start current, it indicates that the circuit is short-circuited. Thus the controlling unit 550 generates the corresponding controlling signal, such that the power supplying apparatus with the protection mechanism 500 stops outputting the soft-start current or is fully turned off, or generates an alarm to indicates that the circuit is short-circuited, so as to inform the user to perform a subsequent repairing process for the power supplying apparatus with the protection mechanism 500 or the load thereof. Alternatively, the controlling unit 550 may lock the power supplying apparatus with the protection mechanism 500 in the protection state, or may fully turn off the power supplying apparatus with the protection mechanism 500, so as to save the power consumption.

Figure 6:
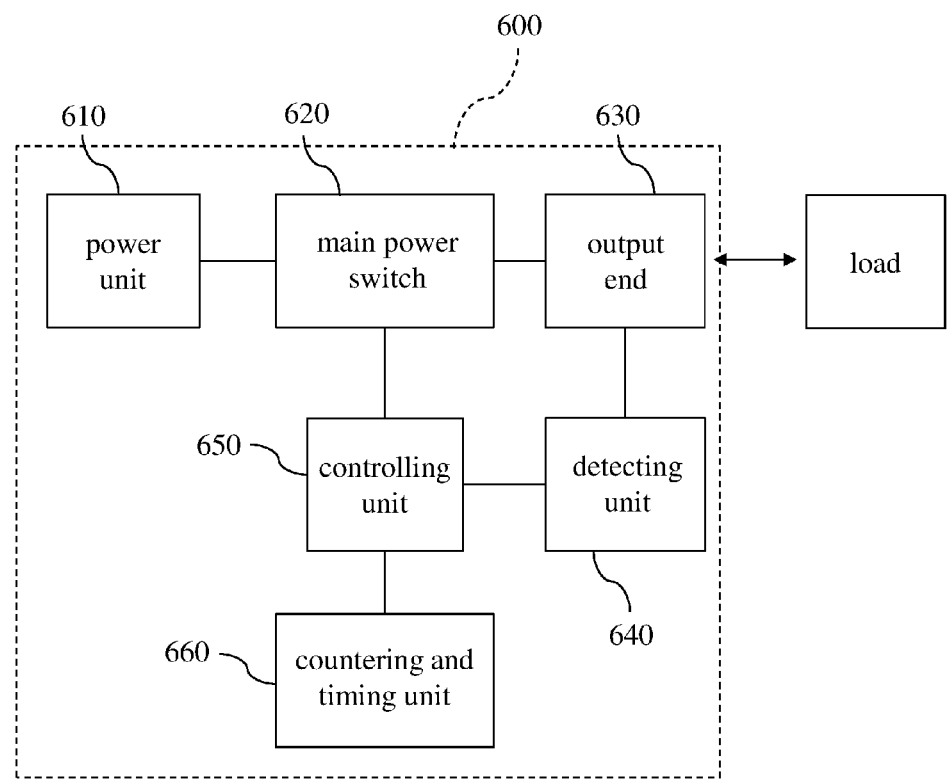
FIG. 6 shows a schematic diagram of a power supply apparatus with a protection mechanism according to a sixth embodiment of the disclosure.

FIG. 6 shows a schematic diagram of a power supply apparatus with a protection mechanism according to a sixth embodiment of the disclosure. The power supply apparatus with the protection mechanism 600 includes a power unit 610, a main power switch 620, an output end 630, a detecting unit 640 and a controlling unit 650.

The power unit 610 generates a power voltage. In the embodiment, the power unit 610 is, for example, a power supply or a battery or a charger, and generates a power voltage with a large power to provide to the load.

The main power switch 620 is coupled to the power unit 610, receives the power voltage and a controlling signal, and outputs the power voltage according to the controlling signal. In the embodiment, the main power switch 620 is, for example, a MOSFET. The main power switch 620 conducts or does not conduct according to a control of the controlling signal, so as to output or not output the power voltage to output end accordingly.

The output end 630 is coupled to the main power switch 620 and suitable to output the power voltage. The output end 630 is also suitable to connect to the load, so as to output the power voltage to the load.

The detecting unit 640 is coupled to the output end 630 and detects a current state and/or a voltage state of the output end 630, so as to generate a detecting signals. Wherein the current state and/or the voltage state of the output end 630 includes, for example, a current and/or voltage value of the output end 630, and a detecting signals/events generated by protection circuits (such as an overcurrent or a short-circuit protection circuit). For example, the detecting signals/events of the protection circuit with overcurrent or short-circuit protection is generated when the output end 630 is connected to a load after the power supplying apparatus with the protection mechanism 600 already operates.

The controlling unit 650 is coupled to the detecting unit 640 and the main power switch 620, receives the detecting signals, so as to generate the controlling signal. That is, when the controlling unit 650 receives the detecting signals, the controlling unit 650 may determine and generate the corresponding controlling signals according to the change of the current value and/or the voltage value of the detecting signal or the current operation state of the power supplying apparatus with the protection mechanism 600. The above operation state includes, for example, whether the output end 630 is connected to the load before or after the power supplying apparatus with the protection mechanism 600 starts to operate, or whether the short circuit occurs when or after the power supplying apparatus with the protection mechanism 600 is connected to the load. It means that the control mechanism inside the controlling unit 650 could be configured "dynamically and "re-programmed" according to the current operation state of the power supplying apparatus with the protection mechanism. That is, when the controlling unit 650 receives the detecting signals, the controlling unit 650 may generate the corresponding controlling signal according to the current setting value or condition of the control mechanism of the controlling unit 650. For example, the power supplying apparatus 600 with the protection mechanism operates for the first time initialization of the system operation during the power-on stage, the setting value of "short circuit current protection threshold" and/or "short circuit protection delay time threshold" inside the controlling unit 650 may be set as a lower value with higher sensitivity, so as to divide the current magnitude and energy of the inrush current when the load is connected. After finishing the process for reducing and dividing the inrush current, the setting value of "short circuit current protection threshold" and/or "short circuit protection delay time threshold" inside the controlling unit 650 may be set to a higher value with lower sensitivity, so as to perform the short circuit protection under the normal operation state.

In the whole operation, in one embodiment, assuming that the power supplying apparatus with the protection mechanism 600 is certainty connected to the load, i.e. the output end 630 is connected to the load. The user starts operating the power supplying apparatus with the protection mechanism 600, and then the controlling unit 650 generates the controlling signal to the main power switch 620, such that the main power switch unit 620 conducts. That is, the main power switch unit 620 may output the power voltage to the load through the output end 630. Then the detecting unit 640 can detect the current state and/or a voltage state and those detecting signals/events generated by voltage and/or current protection circuits and accordingly generate the detecting signal to the controlling unit, such that the controlling unit 650 performs a corresponding subsequent process, thereby achieving the effect of monitoring and protection.

When the current value of the detecting signal generated by the detecting unit 640 is suddenly increased and the current value is greater than the short-circuit current protection threshold and "short circuit protection delay time threshold" value of the controlling unit 650, it indicates that the circuit may have the inrush current or may be short-circuited. At this time, the controlling unit 650 starts the short circuit protection, and within a predetermined time, the controlling unit 650 may try to determines that whether the source of the short-circuited current is the inrush current or a true short circuit. Then, according to a predetermined time interval, the controlling unit 650 controls and conducts the main power switch 620, for example, preset up to 3 times (counter number), so as to provide the power voltage to the load through the output end 630. At the same time, the controlling unit 650 continues to detect the current state and/or the voltage state of the output end 630 and those detecting signals/events generated by voltage and/or current protection circuits (such as an overcurrent or a short circuit event signals) through the detecting unit 640, so as to determine whether the circuit is certainly a true short-circuited or inrush current still existing in the system or not.

After a predetermined time interval and/or a predetermined counter number of forcing the controlling unit 650 to control and conduct the main power switch 620, the controlling unit 650 can determine that the circuit is short-circuited if the received current value of the detecting signal thereof is still greater than the "short circuit current protection threshold" value. Then, the controlling unit 650 generates the corresponding controlling signal, such that the power supplying apparatus with the protection mechanism 600 stops operating, or generates an alarm to indicates that the circuit is short-circuited, so as to inform the user to perform a subsequent repairing process for the power supplying apparatus of the protection mechanism 600 or the load thereof, or the controlling unit 650 may lock the power supplying apparatus with the protection mechanism 600 in the protection state, or may completely turn off the power supplying apparatus with the protection mechanism 600, so as to save the power consumption.

In another embodiment, this embodiment describes that the power supplying apparatus with the protection mechanism 600 is not connected to the load, i.e. the output end 630 is not connected to the load. The user starts operating the power supplying apparatus with the protection mechanism 600, such that the controlling unit 650 controls and conducts the switching unit 620, so as to output the power voltage to the output end 630. Then, the controlling unit 650 continues to monitor that the current state and/or the voltage state of the output end 630 is normal or not through the detecting unit 640, and waits to the load to be connected. When a waiting time exceeds a predetermined "idle time" without load connected, the controlling unit 650 generates the corresponding controlling signal, such that the power supplying apparatus with the protection mechanism 600 is fully turned off and the power consumption is saved.

In another situation, when the waiting time does not exceed the predetermined "idle time" without load, the user connects the load to the power supplying apparatus with the protection mechanism 600, i.e. the load is connected to the output end 630. Since the power supplying apparatus with the protection mechanism 600 already operates, the current value of the detecting current generated by the detecting unit 640 is suddenly increased. If the current value is greater than the "short circuit protection threshold" current value of the controlling unit 650, it indicates that the circuit may have a huge inrush current or may be short-circuited. At this time, within a predetermined time interval, the controlling unit 650 controls and conducts the switching unit 620, such as preset up to 3 times, so as to provide the power voltage to the load through the output end 630. The controlling unit 650 continues detecting the current state of the output end 630 and those detecting signals/events generated by voltage and/or current protection circuits (such as an overcurrent or a short circuit event signals) through the detecting unit 640, so as to determine whether the circuit is certainly a true short-circuit or inrush current still existing in the system.

Then, within a predetermined time interval and/or a predetermined counter number of forcing the controlling unit 650 to control and conduct the main power switch 620, the controlling unit 650 determines that the received current value of the detecting signal thereof is smaller than the short circuit protection threshold current value, it indicates that the circuit is not the short circuit, i.e. the above current value increased suddenly is an instantaneous inrush current. Then, the controlling unit 650 generates the corresponding controlling signal, so as to control switching unit 620 to continue conducting, so as to continue providing the power voltage to the load and the circuit is not mistakenly determined as the short circuit. Therefore the power supplying apparatus with the protection mechanism is not locked in the protection state.

In another situation, after a predetermined time interval and/or a predetermined counter number of forcing the controlling unit 650 to control and conduct the main power switch 620, the controlling unit 650 determines that the received current value of the detecting signal thereof is greater than the "short circuit protection threshold" current value, it indicates that the circuit is short-circuited, i.e. the above current value increased suddenly is occurred by the short circuit. Then, the controlling unit 650 generates the corresponding controlling signal, so as to control and turn off the switching unit 620 and not provide the power voltage to the load and thus the power supplying apparatus with the protection mechanism is locked in the protection state.

Furthermore, the power supplying apparatus with the protection mechanism 600 further includes a countering and timing unit 660. The countering and timing unit 660 is connected to the controlling unit 650 (or is integrated inside the controlling unit) and provides a (programmable) countering value to the controlling unit. When the current value of the detecting signal generated by the detecting unit 640 is suddenly increased, the controlling unit 650 controls and conducts the switching unit 620 according to a predetermined time interval and/or a predetermined counter number corresponding to the counter value. Then, the controlling unit 650 continues to detect the current state of the output end 630 through the detecting unit 640, so as to determine whether the current is a short-circuited current or a merely instantaneous inrush current.

According to the power supply apparatus with the soft-start function and the protection mechanism of the embodiments of the disclosure, the controlling unit generates the first controlling signal, the second controlling signal (and the fourth controlling signals) according to the current detecting signal generated by the current detecting unit, so as to control the soft-start adjusting unit to adjust a magnitude of the current value of the soft-start current, such that the working voltage generated by the voltage stabilizing unit suitably is increased to be equal to or close to the voltage value of the power voltage according to the soft-start adjusting unit, thereby finishing the soft-start process and then directly outputting the power voltage to the voltage stabilizing unit. Therefore, an inrush current generated without the soft-start process that damages the circuit may be effectively avoided. Additionally, the displaying unit may further shows whether the circuit is short-circuited, so as to increase the circuit security. Furthermore, the controlling unit may further generates the corresponding first controlling signal, the corresponding second controlling signal (and the corresponding fourth controlling signals) according to the current detecting signal and the voltage detecting signal generated by the voltage detecting unit at the same time. Thus a generated inrush current that damages the circuit may be also efficiently avoided.

Additionally, the detecting unit detects the current state and/or the voltage state of the output end to generate the detecting signal, and the controlling unit determines the operation state of the power supplying apparatus with the protection mechanism according to the detecting signals and generates the corresponding controlling signals to control the soft-start adjusting unit or the main power switch unit to perform the corresponding operation, so as to determines whether the output voltage is providing continuously or the protection state is entered. Therefore it may effectively determine that the circuit is certainly short-circuited to avoid the erroneous operation, i.e. avoid the merely instantaneous inrush current resulted in erroneously determining the circuit as being short-circuited. At the same time, through the soft-start process introduced by the soft-start adjusting unit and multiple short circuit protection of forcing the controlling unit to control and conduct the main power switch unit, the current and energy of the huge inrush current is divided, so as to avoid the power supplying apparatus with the protection mechanism from being locked in the protection state.

Although the disclosure has been explained in relation to its preferred embodiment, it does not intend to limit the disclosure. It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A power supply apparatus with a soft-start function, suitable to supply a power to a load, the load comprising a voltage stabilizing unit and a load unit coupled in parallel, the power supply apparatus with the soft-start function comprising:
   a power unit, generating a power voltage;
   a soft-start adjusting unit, coupled to the power unit and suitable to couple to the voltage stabilizing unit, receiving the power voltage, a first controlling signal and at least one second controlling signal, and transforming the power voltage to a soft-start current according to the first controlling signal and the at least one second controlling signal, so as to output the soft-start current to the voltage stabilizing unit or output the power voltage to the voltage stabilizing unit;
   a current detecting unit, coupled to the power unit and suitable to couple to the voltage stabilizing unit, measuring a current of a loop formed between the power unit and the voltage stabilizing unit, so as to generate a current detecting signal; and
   a controlling unit, coupled to the current detecting unit, receiving the current detecting signal, so as to generate the first controlling signal and the at least one second controlling signal.

2. The power supply apparatus with the soft-start function as claimed in claim 1, further comprising:
   a displaying unit, coupled to the controlling unit, receiving a third controlling signal generated by the controlling unit, so as to display the third controlling signal;
   wherein the controlling unit further compares a current value of the current detecting signal from the detecting unit with a predetermined current value, so as to generate the third controlling signal accordingly to indicate a short circuit condition and turns off the soft-start adjusting unit.

3. The power supply apparatus with the soft-start function as claimed in claim 1, when the current value of the current detecting signal is less than the predetermined current value, it indicates that a short circuit does not occur, and the controlling unit generates the third controlling signal with low logic level to the displaying unit; when the current value of the current detecting signal is greater than the predetermined current value, it indicates that the short circuit occurs, the controlling unit generates the third controlling signal with high logic level.

4. The power supply apparatus with the soft-start function as claimed in claim 1, further comprising:
   a voltage detecting unit, coupled to the controlling unit and suitable to couple to the voltage stabilizing unit in parallel, measuring the voltage on the voltage stabilizing unit, so as to generate a voltage detecting signal to the controlling unit.

5. The power supply apparatus with the soft-start function as claimed in claim 1, wherein the soft-start adjusting unit comprises:
   a first switching unit, coupled to the power unit and the controlling unit and suitable to couple to the voltage stabilizing unit, receiving the power voltage and the first controlling signal, and outputting the power voltage to the voltage stabilizing unit according to the first controlling signal; and
   a current adjusting unit, coupled to the controlling unit and coupled to the first switching unit in parallel, receiving the power voltage and the at least one second controlling signal, and transforming the power voltage to the soft-start current to output the soft-start current to the voltage stabilizing unit.

6. The power supply apparatus with the soft-start function as claimed in claim 5, wherein current adjusting unit comprises:
a first resistor, having a first terminal and a second terminal, wherein the first terminal of the first resistor is coupled to the power unit; and
a second switching unit, coupled to the second terminal of the first resistor, the controlling unit and the voltage stabilizing unit, receiving the at least one second controlling signal.

7. The power supply apparatus with the soft-start function as claimed in claim 1, wherein the soft-start adjusting unit further transforms the power voltage to the soft-start current according to the first controlling signal, the at least one second controlling signal and a plurality of fourth controlling signals, so as to output the soft-start current to the voltage stabilizing unit or output the power voltage to the voltage stabilizing unit; and the controlling unit further receives the current detecting signal, so as to generate the first controlling signal, the at least one second controlling signal and the fourth controlling signals.

8. The power supply apparatus with the soft-start function as claimed in claim 7, wherein the soft-start adjusting unit comprises:
a third switching unit, coupled to the power unit and the controlling unit and suitable to couple to the voltage stabilizing unit, receiving the power voltage and the first controlling signal, and outputting the power voltage to the voltage stabilizing unit according to the first controlling signal; and
a current adjusting unit, coupled to the controlling unit and coupled to the third switching unit in parallel, receiving the power voltage, the at least one second controlling signal and the fourth controlling signals, and transforming the power voltage to the soft-start current to output the soft-start current to the voltage stabilizing unit.

9. The power supply apparatus with the soft-start function as claimed in claim 8, wherein the current adjusting unit comprises:
N second resistors, N second resistors are sequentially coupled in series, wherein a first resistor of the N second resistors is coupled to the power unit, and N is a positive integer greater than 1;
a fourth switching unit, coupled to the Nth resistor of the second resistors, the controlling unit and the voltage stabilizing unit, receiving the at least one second controlling signal; and
(N−1) fifth switching units, the i-th fifth switching unit and the (i+1)-th second resistor are coupled in parallel, (N−1) fifth switching units are coupled to the controlling unit, so as to receive the fourth controlling signals, wherein 0<i≤N−1.

10. The power supply apparatus with the soft-start function as claimed in claim 1, wherein the amount of the at least one second controlling signal is N, N is a positive integer greater than or equal to 1, and the soft-start adjusting unit comprising:
N third resistors, sequentially coupled in series, wherein a first resistor of the third resisters is coupled to the power unit;

a sixth switching unit, coupled to the N-th third resistor, the controlling unit and the voltage stabilizing unit, receiving the first controlling signal; and
N seventh switching units, i-th seventh switching unit and the i-th third resistor are coupled in parallel, N seventh switching units are coupled to the controlling unit, so as to receive the at least one second controlling signals, wherein 0<i≤N.

11. A power supply apparatus with a protection mechanism, comprising:
a power unit, generating a power voltage;
a soft-start adjusting unit, coupled to the power unit, receiving the power voltage and a plurality of controlling signals, and transforming the power voltage to a soft-start current according to the controlling signals, so as to output the soft-start current to the voltage stabilizing unit or output or stop outputting the power voltage;
an output end, coupled to the soft-start adjusting unit and suitable to output the soft-start current or the power voltage;
a detecting unit, coupled to the output end, detecting a current state and/or a voltage state of the output end, so as to generate a detecting signal; and
a controlling unit, coupled to the detecting unit and the soft-start adjusting unit, receiving the detecting signal, so as to generate the controlling signals.

12. The power supply apparatus with the protection mechanism as claimed in claim 11, wherein the current state and/or the voltage state of the output end comprises the current value of the soft-start current and/or a voltage value of the output end, and a detecting signal generated by those detecting signals/events generated by voltage and/or current protection circuits.

13. The power supply apparatus with the protection mechanism as claimed in claim 11, wherein when the controlling unit receives the detecting signals, the controlling unit correspondingly generate the controlling signals according to a current operation situation or state of the power supplying apparatus with the protection mechanism and the change of the current value and/or the voltage value of the detecting signals.

14. The power supply apparatus with the protection mechanism as claimed in claim 13, wherein the operation state comprises whether the soft-start operation of the soft-start adjusting unit is finished, whether the output end is connected to a load when the power supplying apparatus with the protection mechanism is already operated, or whether a condition for triggering the short circuit protection is achieved when the power supplying apparatus with the protection mechanism detects a load current in the first time.

15. A power supply apparatus with a protection mechanism, comprising:
a power unit, generating a power voltage;
a main power switch, coupled to the power unit, receiving the power voltage and a controlling signal, and outputting the power voltage according to the controlling signal;
an output end, coupled to the main power switch and suitable to output the power voltage;
a detecting unit, coupled to the output end, detecting a current state and/or a voltage state of the output end, so as to generate detecting signals; and
a controlling unit, coupled to the detecting unit and the main power switch, receiving the detecting signals, so as to generate the controlling signal.

16. The power supply apparatus with the protection mechanism as claimed in claim 15, further comprising:
a countering and/or timing unit, coupled to the controlling unit, providing a countering value and/or timing value to the controlling unit.

17. The power supply apparatus with the protection mechanism as claimed in claim 15, wherein the current state and/or the voltage state of the output end comprises the current and/or the voltage value of the output end and detecting signals/events generated by voltage and/or current protection circuits.

18. The power supply apparatus with the protection mechanism as claimed in claim 15, wherein when the controlling unit receives the detecting signals/events, the controlling unit generates the corresponding controlling signal according to the change of the current value and/or the voltage value of the detecting signals and/or the current operation state of the power supplying apparatus with the protection mechanism.

19. The power supply apparatus with the protection mechanism as claimed in claim 18, wherein the current operation state comprises whether the output end is connected to the load before or after the power supplying apparatus with the protection mechanism starts to operate, or whether a short circuit occurs when or after the power supplying apparatus with the protection mechanism is connected to the load.

20. The power supply apparatus with the protection mechanism as claimed in claim 19, wherein the controlling unit further comprises a control mechanism configured dynamically or re-programmed according to the current operation state, the control mechanism comprises a setting value of short circuit current protection threshold and/or short circuit protection delay time threshold, such that when the controlling unit receives the detecting signal, the controlling unit generates the corresponding controlling signal according to the setting value of the control mechanism.

21. The power supply apparatus with the protection mechanism as claimed in claim 20, wherein the power supplying apparatus with the protection mechanism operates for a first time initialization of the system operation during the power-on stage, the setting value of short circuit current protection threshold and/or short circuit protection delay time threshold inside the controlling unit is set as a lower value with higher sensitivity, so as to divide the current magnitude and energy of the inrush current when a load is connected; after finishing the process for reducing and dividing the inrush current, the setting value of short circuit current protection threshold and/or short circuit protection delay time threshold inside the controlling unit is set to a higher value with lower sensitivity, so as to perform the short circuit protection under the normal operation state.

22. The power supply apparatus with the protection mechanism as claimed in claim 15, wherein after a predetermined time interval and/or a predetermined counter number of forcing the controlling unit to control and conduct the main power switch, when the controlling unit determines that the circuit is short-circuited if the received current value of the detecting signal is still greater than a short circuit current protection threshold value, the controlling unit generates the corresponding controlling signal, such that the power supplying apparatus with the protection mechanism stops operating, or the controlling unit generates an alarm to indicates that the circuit is short-circuited, or the controlling unit locks the power supplying apparatus with the protection mechanism in the protection state, or completely turn off the power supplying apparatus with the protection mechanism.

* * * * *